Patented Jan. 10, 1939

2,143,393

UNITED STATES PATENT OFFICE 2,143,393

PROCESS OF REMOVING WEAK GASEOUS ACIDS FROM GASES CONTAINING THE SAME

Heinrich Ulrich, Ludwigshafen-on-the-Rhine, and Hans Baehr and Wilhelm Wenzel, Leuna, Germany, assignors to I. G. Farbenindustrie Aktiengesellschaft, Frankfort - on - the - Main, Germany No Drawing. Application September 15, 1936, Serial No. 100,896. In Germany September 20, 1935

6 Claims. (Cl. 23—2)

The present invention relates to an improved process of removing weak gaseous acids from gases containing the same, more particularly by means of washing liquids having an alkaline reaction which are capable of regeneration by heating.

It is known to use for this purpose organic bases or solutions thereof, as for example alkyl or alkylolamines, for instance mono- or tri-ethanolamine. It has also been proposed to make use of amines which contain two or more atoms of nitrogen.

The present invention is more particularly concerned with an improvement in these processes.

We have found that especially good results are obtained in the said process by using as bases polymerization products of the alkylene-imines, in particular of ethylene-imine, such as may be obtained for example by the polymerization of ethylene imine or its homologues or substitution products thereof, preferably in the presence of catalysts or derivatives of the said polymerization products.

The said polymerization products can be obtained by polymerizing the imines in the presence of agents promoting polymerization. The polymerization may be brought about by allowing the mass to stand for long periods or by heating it in the presence of catalysts. As catalysts there may be used, for example, acids or acid reacting substances, as for instance inorganic acid salts, such as sodium bisulphate, or inorganic or organic acids, such as hydrochloric acid, or also surface-active substances, especially those which still contain a small amount of acid reacting substances from their preparation, as for example bleaching earths or active carbon or silica gel. Other suitable catalysts are, for example, agents which split off acids during the reaction, such as chloramines or boron fluoride, or also oxidizing agents, such as peroxides, for example hydrogen peroxide. These catalysts are usually employed in small amounts and, if desired, the polymerization may be carried out in the presence of solvents or diluents. The reaction may be carried out at temperatures up to about 200° C., preferably between 50° and 120° C.

The washing liquids used according to this invention have the special advantage that they only tend to a very small extent to form foam so that the regeneration apparatus may be constructed smaller and simpler and the leading of the washing liquids over active carbon or the like, such as has been proposed to combat the formation of foam, may be dispensed with.

The bases used according to this invention contain at least 2 nitrogen atoms, but the number of nitrogen atoms may be as many as desired. In order to obtain as great an absorptive capacity of the washing liquids as possible it is advantageous to have as high a nitrogen content as possible. Other groups, by which the properties of the bases are influenced in definite directions, may also be introduced into the polymerization products. Thus for example in order to increase the absorptive capacity, compounds containing nitrogen, as for example amines, such as monoethanol amine, or amino acids, such as glycocoll, may be coupled with the polymerization products. In order to render the volatility of the bases especially low, there may be introduced for example hydroxyalkyl groups, such as hydroxyethyl groups, or also hydrocarbon radicles. The introduction of hydroxyalkyl groups increases the solubility of the bases in water, alcohol and other polar liquids, while the introduction of hydrocarbon groups increases the solubility in paraffin hydrocarbons and similar organic solvents.

The bases need no longer contain hydrogen atoms on the nitrogen atoms. Compounds containing only alkyl groups on the nitrogen atoms may be prepared for example by synthesis with suitable selection of the substances used for the polymerization or also by subsequent alteration of the unsubstituted polymerization products, as for example by methylation by known methods.

The said bases may be used alone or also in admixture with each other or with other washing agents, as for example other organic bases and/or basic-reacting salts of inorganic or organic acids. For example solutions may be used which contain in addition to the bases according to this invention basic-reacting salts of simple organic acids or also tertiary potassium phosphate or potassium metaborate.

By suitable modification of the basic character of the bases, which is usually dependent on the nitrogen content, it is possible to wash out weak gaseous acids of different strengths separately from each other. For example while a weak base absorbs considerably more hydrogen sulphide than carbon dioxide from a gas mixture containing the said two substances, the reverse is the case when using stronger bases. For example by suitable selection of the strength of the bases, the sulphur dioxide may be absorbed from a smoke gas containing sulphur dioxide and carbon dioxide by the use of a weakly basic solution, while the carbon dioxide is left unchanged in the gas; the gas may then be freed from carbon dioxide, if necessary, with a more strongly basic solution in a second washing operation.

When oxygen and other oxidizing gases are present in the gas from which the sulphur dioxide is to be washed out, a small fraction of the sulphur dioxide may be oxidized to sulphuric acid which is no longer capable of being expelled by heating the washing liquid. In this case care may be taken for a periodic or continuous removal of the nonvolatile acids formed by any suitable means, as for example by precipitation with lime, or baryta. The same is also true for the formation of other non-volatile acids, as for example thiosulphuric acid, in the washing out of sulphur dioxide or hydrogen sulphide.

The concentrations of the washing liquids may be selected as desired and depend mainly on the optimum washing conditions for the gas. As a rule, concentrations of from 25 to 40 per cent are most favorable. In the case of difficultly soluble bodies lower concentrations may, however, give specially favorable results and in the case of readily soluble bodies higher concentrations. The concentration may also be selected while having regard to the material of the apparatus in order to obviate attack on the latter which might occur at certain concentrations.

Thus for example no corrosion of aluminium or aluminium alloys takes place when working with highly concentrated solutions and when taking care that the solutions are free from dissolved aluminium compounds.

According to this invention practically all industrial gases may be freed from gaseous weak acids. There may be mentioned in particular distillation gases of coals and the like (as for example coke-oven gas, illuminating gas or low temperature carbonization gas), natural gases, gas mixtures such as are formed by the reaction of coals or hydrocarbons with air, oxygen or steam (as for example producer gas or water gas), gas derived from the thermal splitting of hydrocarbons (as for example cracking gases), or waste gases from destructive hydrogenations, and also smoke gases and other combustion gases. Gases which contain ammonia in addition to gaseous weak acids may also be washed by the washing agents according to this invention and the ammonia may be wholly or partly absorbed by the washing agents.

The gases treated according to this invention may be subjected to any suitable preliminary treatment or after-treatment. For example, for the purpose of removing cyanogen compounds, the gas may be treated first with a solution of a polysulphide of ammonium, sodium or potassium, or also with a suspension of iron hydroxide or other suitable heavy metal compounds, and only then treated according to this invention.

The apparatus in which the gas washing is carried out may be of any kind, as for example washing towers which may contain any desired filling, or mechanically moved washing apparatus, such as disintegrators, Feld washers or Ströder washers. The period during which the gases remain in the washing agent and the other conditions of the washing, such as amount of solution, subdivision of the solution and temperature, depend on the nature of the gas to be washed. For washing out hydrogen sulphide only a very short period of contact is usually necessary while the washing out for example of carbon dioxide requires considerably longer periods of contact. In this way the two gases may to a large extent be washed out separately from each other when this is necessary.

For the removal of carbon dioxide it is also of advantage to keep the solution at elevated temperature during the washing operation, preferably at between about 45° and about 75° C., most suitably at between about 45° and about 55° C. In addition to a more rapid absorption of the carbon dioxide, there is also the thermal advantage that at each circulation of the solution the heating up to the said temperature prior to the regeneration is saved.

The pressure under which the gases are washed may vary between any desired limits. If the gases are under increased pressure, a washing at this pressure is naturally especially advantageous. Although gases which are at atmospheric pressure may be subjected to a change in pressure for the washing, it is usually most economical to wash the gases under the prevailing pressure.

For the regeneration of the washing liquids it is preferable to render the heat content of the regenerated hot solution useful by heat-exchangers. For the rest, the regeneration may be carried out according to any of the known methods. Any desired apparatus, such as towers or expelling columns, may also be used. The regeneration of the solution may also be promoted by rapidly leading away the disengaged gases, for example by leading, in counter-current to the solution which is trickling down, steam or a pure gas, as for example nitrogen. The expelling may also be effected or assisted by vapors of organic substances, as for example chlorine derivatives of paraffin hydrocarbons or benzene. In order to expel the last traces of an absorbed gas from a solution, another gas, as for example carbon dioxide, which is itself absorbed to a certain extent, may also be led in counter-current. Any source of heat may serve for heating the solution, as for example, direct or indirect heating with steam, waste steam, direct firing, hot gases, such as combustion gases, or other hot media. The pressure during the regeneration may also be as desired. In the case of gaseous acids which are only expelled with difficulty, it is preferable to expel them under pressure because in this way the boiling point is raised and a more rapid disengagement of the gaseous weak acids is effected. The expelling may also be carried out under reduced pressure and at correspondingly reduced temperature. In order to retain every trace of basic washing agent which is carried along with the expelled gas, it is preferable to provide a good stripping of the effluent vapors and to return any basic constituents carried along to the washing liquid.

In order to avoid any possibility of a waste of base, the vapors leaving with the expelled gases may be wholly or partly condensed and then evaporated again, the resulting vapor being returned to the expelling device for the treatment of the washing liquid.

As solvents for the substances employed according to this invention, aqueous or non-aqueous media may be used. Non-aqueous and non-hydrating solvents may be used for special effects, as for example for the simultaneous removal of gaseous weak acids and readily volatile organic compounds, as for example benzene, from gases. Any desired mixtures of non-hydrating solvents may also be used.

The apparatus serving for the washing and the regeneration of the washing liquids are preferably constructed of industrially-available metals. It is frequently preferable to line the apparatus with mortar, acid-proof bricks and cement or wood lining in order to obtain an increased protection of the metal, in particular against mechanical influences. Generally speaking iron apparatus may be used, especially when hydrogen sulphide is to be washed out, the latter apparently exerting a certain protective action on the apparatus material. In other cases, aluminium is of advantage. Known industrial alloys, as for example Silumin or V2A-steel, may also be used.

It is a special advantage of the process according to this invention that a separation of solid substances during the washing of the gas or during the regeneration of the washing liquids does not take place at all or only to a very slight extent so that even when the washing liquid is strongly laden with hydrogen sulphide, a carbon dioxide or hydrocyanic acid no stoppages or other mechanical trouble in the apparatus need be feared. A further advantage is the high absorptive power of the solutions which is partly attributable to the fact that the solutions are of low viscosity and are mobile and may therefore be used in comparatively high concentrations.

The following examples will further illustrate how this invention may be carried out in practice, but the invention is not restricted to these examples.

Example 1

A polymerized ethylene-imine, which has been prepared by allowing a solution of ethylene-imine of 10 per cent strength to stand for about 12 hours at ordinary room temperature, is used for washing out carbon dioxide. In a concentration of 50 per cent, the aqueous solution is of low viscosity and readily mobile. It has a specific gravity of 1.048 and absorbs 36.4 volumes of $CO_2$ per volume of solution. A 35.8 per cent solution (specific gravity 1.035) absorbs 27.0 volumes of $CO_2$ per volume of solution.

Example 2

A waste gas from the destructive hydrogenation of coal, which contains 6 per cent of hydrogen sulphide and 7 per cent of carbon dioxide is trickled with a 40 per cent aqueous solution of a polymerization product of ethylene-imine. When treating 300 cubic meters of gas with 1 cubic meter of liquid, the gas is completely freed from hydrogen sulphide and its content in carbon dioxide is reduced to 1 per cent. Each cubic meter of the liquid takes up 36 cubic meters of carbon dioxide and hydrogen sulphide. The laden scrubbing liquid is regenerated by treating it with steam in a column and reintroduced into the washing device after cooling.

Example 3

Gases obtained by the roasting of pyrite are freed from dust, cooled and then trickled with a 50 per cent aqueous solution of a polymerization product of ethylene imine in which, by treatment with ethylene oxide, all hydrogen atoms attached to nitrogen atoms have been replaced by hydroxyethyl groups. When employing 1 cubic meter of solution for each 400 cubic meters of gas, the treated gas contains less than 0.1 per cent of sulphur dioxide. Each cubic meter of the solution takes up 31.5 cubic meters of sulphur dioxide which may be expelled by heating.

The procedure is similar when employing polymerization products of propylene-imine as the purifying agent.

Use may also be made for example of polymerized C-methyl-ethylene-imine, C-ethyl-ethylene-imine, C-butyl-ethylene-imine, or N-methyl-ethylene-imine, N-butyl-ethylene-imine, N-hexyl-ethylene-imine, N-dodecyl-ethylene-imine, or N-octadecyl-ethylene-imine. The N-alkyl derivatives may be prepared by converting ethylene imine with an alkyl halide and then polymerizing, or the polymerized ethylene-imine may be converted with an alkyl halide. In the latter case part or all of the hydrogen atoms attached to nitrogen may be replaced by alkyl groups. Similarly, acyl derivatives may be produced, which are also very suitable for the purposes of the present invention, as for example acetyl derivatives or derivatives of lactic or stearic acid.

What we claim is:—

1. The process of removing a weak gaseous acid from a gas containing the same which comprises washing said gas with a solution comprising a substance selected from the group consisting of the polymerization products of lower alkylene-imines and their N- and C- derivatives.

2. The process as claimed in claim 1, in which the washing liquid comprises a polymerization product of ethylene-imine.

3. The process as claimed in claim 1, in which the washing liquid comprises a polymerization product of an alkylene-imine, in which at least one hydrogen atom attached to a nitrogen atom is replaced by a substituent selected from the class consisting of the alkyl and hydroxyl-alkyl groups.

4. The process as claimed in claim 1, in which the washing liquid comprises a polymerization product of an alkylene-imine, in which at least one hydrogen atom attached to a nitrogen atom is replaced by a hydroxy-ethyl group.

5. The process as claimed in claim 1, in which the washing liquid comprises a polymerization product of an alkylene-imine, in which all hydrogen atoms attached to nitrogen atoms are replaced by a substituent selected from the class consisting of the alkyl and hydroxy-alkyl groups.

6. The process as claimed in claim 1, in which the washing liquid comprises a polymerization product of an alkylene-imine, in which all hydrogen atoms attached to nitrogen atoms are replaced by an alkyl group.

HEINRICH ULRICH.
HANS BAEHR.
WILHELM WENZEL.